United States Patent
Hollatz et al.

(10) Patent No.: US 6,222,919 B1
(45) Date of Patent: Apr. 24, 2001

(54) METHOD AND SYSTEM FOR ROUTING INCOMING TELEPHONE CALLS TO AVAILABLE AGENTS BASED ON AGENT SKILLS

(75) Inventors: Michael C. Hollatz, Villa Park; Daniel F. Baker, Rolling Meadows; Joseph C. Steinlicht, Glen Ellyn; Mark J. Michelson, Elburn; Kurt E. Sunderman, Geneva, all of IL (US)

(73) Assignee: Rockwell International Corporation, Seal Beach, CA (US)

( * ) Notice: Subject to any disclaimer, the term of this patent is extended or adjusted under 35 U.S.C. 154(b) by 0 days.

(21) Appl. No.: 08/304,345

(22) Filed: Sep. 12, 1994

(51) Int. Cl.[7] ....................................... H04Q 3/64
(52) U.S. Cl. ........................................ 379/266; 379/309
(58) Field of Search ..................... 379/265, 266, 379/309, 201, 210, 211, 212, 214, 213

(56) References Cited

U.S. PATENT DOCUMENTS

| | | | |
|---|---|---|---|
| 4,694,483 | 9/1987 | Cheung | 379/34 |
| 4,757,267 | 7/1988 | Riskin | 379/113 |
| 4,757,529 | 7/1988 | Glapa et al. | 379/244 |
| 5,008,930 | 4/1991 | Gawrys et al. | 379/210 |
| 5,046,088 * | 9/1991 | Margulies | 379/265 |
| 5,062,103 | 10/1991 | Davidson et al. | 370/58.1 |
| 5,206,903 * | 4/1993 | Kohler et al. | 379/309 |
| 5,276,731 | 1/1994 | Arbel et al. | 379/88 |
| 5,299,260 | 3/1994 | Shaio | 379/265 |
| 5,309,513 * | 5/1994 | Rose . | |
| 5,329,583 | 7/1994 | Jurgensen et al. | 379/266 |

OTHER PUBLICATIONS

Automated Attendants—Let Customers Reach the Right Person Faster by Cameron Ives, Jul. 1990.
Automatic Call Distribution Services in the ROLM® CBX L. Joanne Kanow—ROLM Corporation, Jun. 1980.

* cited by examiner

Primary Examiner—Ahmad Matar
(74) Attorney, Agent, or Firm—Welsh & Katz, Ltd.; James A. Scheer; Jon P. Christensen

(57) ABSTRACT

A method and automatic call distribution system 100 for routing incoming telephone calls 206 from external telephonic units 102 to selected ones of a plurality of agents A1001–A1007 wherein the agents A1001–A1007 are grouped into skill groups 110a–110n are provided. Each of the skill groups 110a–110n is comprised of agents having a common agent-skill indicator. An agent-skill indicator being representative of a skill of the agent. Further, the agents in a skill group are arranged by length of time the agent has been available. An incoming telephone call 206 is initially assigned a call-skill indicator representative of a skill deemed useful in satisfying a need of the external caller. The call-skill indicator is then matched to a common agent-skill indicator of one of the skill groups. The telephone call is routed to the available agent in the matched skill group having been available the longest time. If no agents are available, the external caller is placed in queue until an available agent enters the matched skill group. Unavailable agents are stored in an unavailable group 200 and are inserted into corresponding skill groups 110a–110n when they become available.

19 Claims, 3 Drawing Sheets

METHOD AND SYSTEM FOR ROUTING INCOMING TELEPHONE CALLS TO AVAILABLE AGENTS BASED ON AGENT SKILLS

BACKGROUND OF THE INVENTION

The present invention relates generally to automatic call distribution systems and, more particularly, to an automatic call distribution system and method for grouping available agents by individual skills in such a call distributor to expeditiously connect an incoming telephone caller with an available agent having one or more skills deemed useful in handling the specific needs of the caller.

Automatic call distributors (ACDs) are becoming increasingly utilized by businesses to automatically route incoming customer calls to available agents. Some ACDs route incoming telephone calls based on the skills of the agents and the needs of the incoming callers. When agents having the necessary skills are unavailable, the customer is typically placed in one or more queues to await an available agent or is connected to an agent having somewhat related skills.

One method for automatic call distribution is disclosed in U.S. Pat. No. 5,206,903 issued to Kohler et al. In the Kohler method, each incoming call is initially assigned up to three prioritized skill numbers representative of the estimated skill requirements of the calling party. Each agent possesses up to four skill numbers that represent various skills of the agent. For an agent having more than four skills, artificial skill numbers are used. In a travel agency, for example, agents may have knowledge of the cities, sites, etc. of one or more states. To accommodate agents having knowledge of more than four states, the Kohler method provides for the assignment of artificial skill numbers representing a group of states, such as the New England states.

Upon arrival of an incoming call, a first group of agents are searched in an attempt to match the first prioritized skill number of the call with an available agent having that skill number. Failing to find a match of the first skill number, a second search is conducted for an available agent having either the first or second skill number. If a match still has not been found, a search of the first group of agents is made for an available agent having either the first, second or third skill number. If after the third search the incoming caller is not yet connected with an agent, a second group of agents is searched for a predetermined, artificial skill number designating general knowledge in the desired area while the first group of agents continues to be searched for either the first, second or third skill number.

As will be readily apparent to those skilled in the art, the agent selection process disclosed in Kohler et al. may result in undesirable time delays as the agents are searched for a correct match. Since the Kohler invention searches all of the agents in a group at each level of searching, the system may take an inordinately long time to match caller skill requirements to agent skills, especially if each group has a large number of agents. The Kohler method will search all agents in the first group for all three skill numbers even if all agents in the group are unavailable. Further, even after this extended time period, the caller may be connected to an agent having an artificial skill number and, therefore, possibly only a cursory knowledge of the subject matter of the call.

Accordingly, there is a need for an improved automatic call distribution system and method for grouping available agents in which the incoming caller is connected, in a timely fashion, to an available agent having one or more specific skills deemed necessary to handle the call.

SUMMARY OF THE INVENTION

This need is met by the method and automatic call distribution (ACD) system of the present invention wherein available agents are arranged in skill groups based on agent skills. Each skill group has a common agent-skill indicator representative of a skill common to all of the agents in the skill group. The agents in a skill group are further arranged by length of time each agent has been available. Consequently, the agent in a skill group having been available for the longest time will receive the next incoming telephone call routed to that skill group.

In accordance with one aspect of the present invention, when an incoming call is received by the ACD system of the present invention, computer means identifies a skill, or skills, deemed useful in satisfying the needs of a caller and matches the caller's need to a common agent-skill indicator of one of the skill groups. The computer means groups available agents into the above described skill groups. The computer means then checks the matched skill group for an available agent. If an available agent is found, the computer means routes the call to the available agent via connecting means. If no available agents are found, the computer means places the call in queue and waits for an available agent to be placed in the matched skill group.

The computer means further detects when an available agent becomes unavailable, either by accepting a telephone call or otherwise, and removes the agent from all skill groups in which the agent was a member. Unavailable agents are stored in memory means until they become available. When an unavailable agent becomes available, the computer means places the agent in its one or more corresponding skill groups to wait incoming telephone calls.

In accordance with another aspect of the present invention, an automatic call distribution system for matching skill requirements of an incoming telephone caller with skills of one of a plurality of agents is provided. Some of the agents being available to accept an incoming telephone call. The system comprises computer means for detecting the skill requirements of the caller, for specifying skills possessed by each of the plurality of agents, for creating at least one skill group each comprised of available agents having a common skill, and for selecting one of the at least one skill group comprised of available agents having the common skill which matches the skill requirements of the caller. Connecting means connects the caller to one of the available agents within the selected skill group.

Preferably, the computer means comprises timing means for detecting a length of time during which each of the available agents have been available. The connecting means then connects the caller to one of the available agents within the selected skill group based on the length of time each of the available agents has been available.

The computer means may also detect when each of the available agents becomes unavailable. A memory device stores the detected unavailable agents until the unavailable agents become available. The computer means then retrieves available agents from the storing means and inserts the available agents into appropriate ones of the skill groups.

The computer means may comprise calling means for detecting a destination telephone number called by the caller. The calling means preferably identifies the destination telephone number called by the caller based on dialed number identification system information. The computer means thereafter determines the skill requirements of the caller based on the destination telephone number.

To provide further information regarding an incoming telephone call, the computer means comprises dialed means for detecting an origin telephone number indicative of telecommunications equipment used by the external caller to place the incoming telephone call. The computer means may then determine the skill requirement of the caller based solely on the origin telephone number or in conjunction with the destination telephone number. Further, the computer means may comprise prompting means for prompting the caller to provide predetermined information. The predetermined information is used by the computer means to detect the skill requirements of the caller.

By arranging the agents in the present invention by skill group and time of availability, the computer means is able to efficiently find an available agent with the desired skill. The computer means does not have waste time searching for agents who are available or have desired skills since all of the agents in the skill group are available and have the common skill of the group. Further, since only one skill group is searched, the computer means can immediately detect when an agent having the desired skill becomes available.

Thus, the present invention provides an automatic call distribution system and method for routing incoming telephone calls to selected ones of a plurality of agents in which the incoming call is connected, in a timely fashion, to an available agent having one or more specific skills deemed necessary to handle the call.

These and other features and advantages of the present invention will become apparent from the following detailed description, the accompanying drawings and the appended claims.

DETAILED DESCRIPTION OF THE INVENTION

Figure 1:
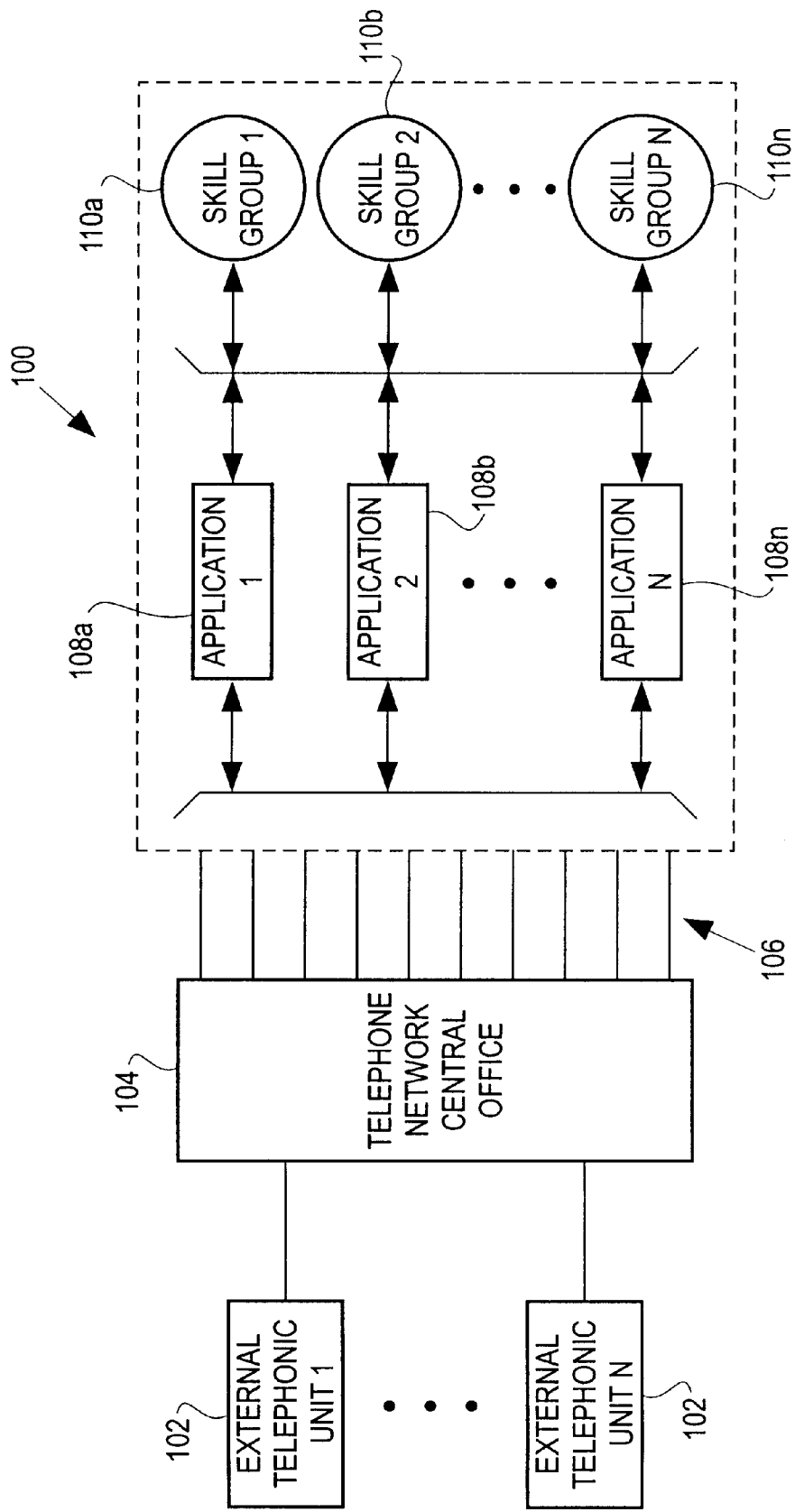
FIG. 1 is a schematic diagram of an automatic call distribution (ACD) system in accordance with the present invention.

In accordance with the present invention, an automatic call distribution (ACD) system 100 selectively connects incoming telephone calls from external callers to a plurality of agents, as shown schematically in FIG. 1. External callers use a plurality of conventional external telephonic units 102 which are connected to a telephone network central office 104 to place telephone calls. The telephone calls are transmitted, in turn, over telephone trunks 106 to the ACD system 100.

In the ACD system 100, a plurality of applications 1–N, designated 108a through 108n, route the incoming calls to selected ones of skill groups 1–N which are designated 110a through 110n. As those skilled in the art will readily comprehend, applications 108a–108n are representative of the various, conventional software based devices within an ACD system for routing telephone calls. In a conventional ACD system, instructions for routing a telephone call may be divided into routing vectors, applications, application vectors, and the like. Further, it should be understood that the number of applications and skill groups are only limited by practicality and do not necessarily have to be an equal number.

The applications 108a–108n route incoming telephone calls based on a number of well known methods. For example, an incoming telephone call may be routed based on information provided by the telephone network central office 104. The telephone network central office 104 may provide dialed number identification system (DNIS) information identifying a destination telephone number dialed by the external caller. The telephone network central office 104 may also provide automatic number identification (ANI) information which identifies an origin telephone number representative of the external telephonic unit 102 used by the caller to place the incoming telephone call. Additionally, the incoming telephone call may be routed based on the particular telephone trunk 106 over which the call is transmitted to the ACD system 100. To obtain further information, the ACD system 100 may request that the external caller provide predetermined information, such as an account number or state the type of call (i.e. sales, inventory, billing, etc.). The incoming telephone call is thereafter routed based on the predetermined information provided by the caller. Since such methods for detecting information relating to incoming telephone calls are well known and are not integral to the present invention beyond obtaining information to route incoming telephone calls to appropriate agent skill groups, details of such methods will not be further disclosed herein. It should be understood, however, that numerous methods for detecting a need of the caller may be advantageously employed in the present invention.

Figure 3:
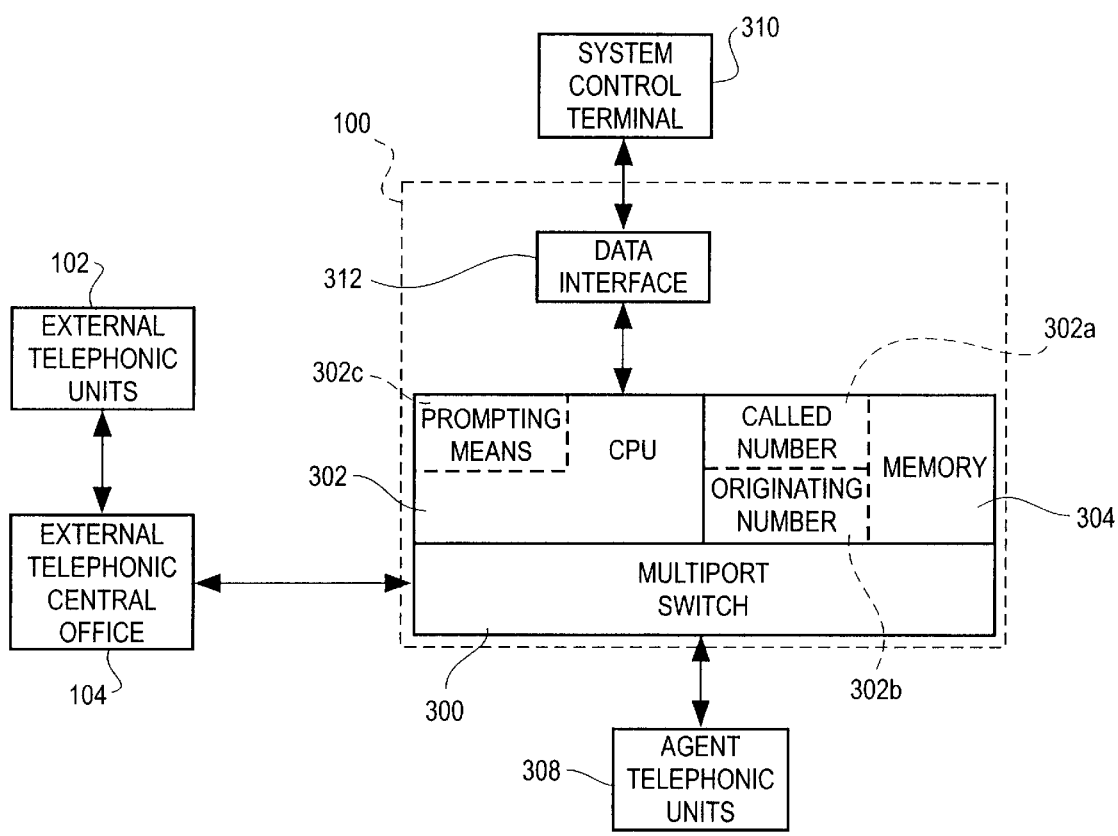
FIG. 3 is a schematic diagram of an exemplary hardware configuration of an ACD system in accordance with the present invention.

An exemplary hardware configuration of the ACD system 100 is shown in FIG. 3. The ACD system 100 includes connecting means comprised of a multiport switch 300 controlled by computer means, shown as a central processing unit (CPU) 302, in conjunction with an associated memory device 304. The ACD system 100 receives incoming telephone calls initiated by the external telephonic units 102 and distributes the incoming telephone calls received at the multiport switch 300 to agents stationed at agent telephonic units 308.

The CPU 302 is the primary controller for the ACD system 100. Preferably, the processing power of the CPU 302 is provided by a 32 bit Motorola 68030 microprocessor. The CPU 302 retrieves the applications 108a–108n stored in the memory 304 and executes the applications 108a–108n to control the routing of incoming telephone calls via the multiport switch 300. The switch may have around 3,000 I/O ports for connection to the agent telephonic units 308, to one or more voice response units (not shown) and to a system control terminal 310. The CPU 302 is shown consisting of called number means 302a for detecting the telephone number called by the caller, originating number means 302b for detecting the origination telephone number of the telephone used by the caller and prompting means 302c for prompting the caller for additional information. Each of these means 302a, 302b and 302c are software based and are well known in the art.

An operator communicates with the CPU 302 through the system control terminal 310 via a data interface 312. The operator typically has the capability of retrieving data from the CPU 302, entering data in the memory 306 and modifying applications 108a–108n. Although not shown, it should be readily apparent to those skilled in the art that the agent telephonic units 308 may also include a computer terminal for retrieving data from and entering data into the ACD system 100.

The present invention can be implemented in numerous types and sizes of systems for distributing calls to selected ones of a plurality of agents. However, some preferred types of call distribution systems are disclosed in U.S. Pat. No. 5,268,903, issued to Jones et al. on Dec. 7, 1993, entitled "Multichannel Telephonic Switching Network With Different Signaling Formats and Connect/PBX Treatment Selectable For Each Channel"; U.S. Pat. No. 5,140,611, issued to Jones et al. on Aug. 18, 1992, entitled "Pulse width Modulated Self-Clocking and Self-Synchronizing Data Transmission and Method for a Telephonic Communication Switching System"; and U.S. Pat. No. 5,127,004, issued to Lenihan et al. on Jun. 30, 1992, entitled "Tone and Announcement Message Code Generator for a Telephonic Switching System and Method", the disclosures of which are hereby incorporated by reference.

Figure 2:
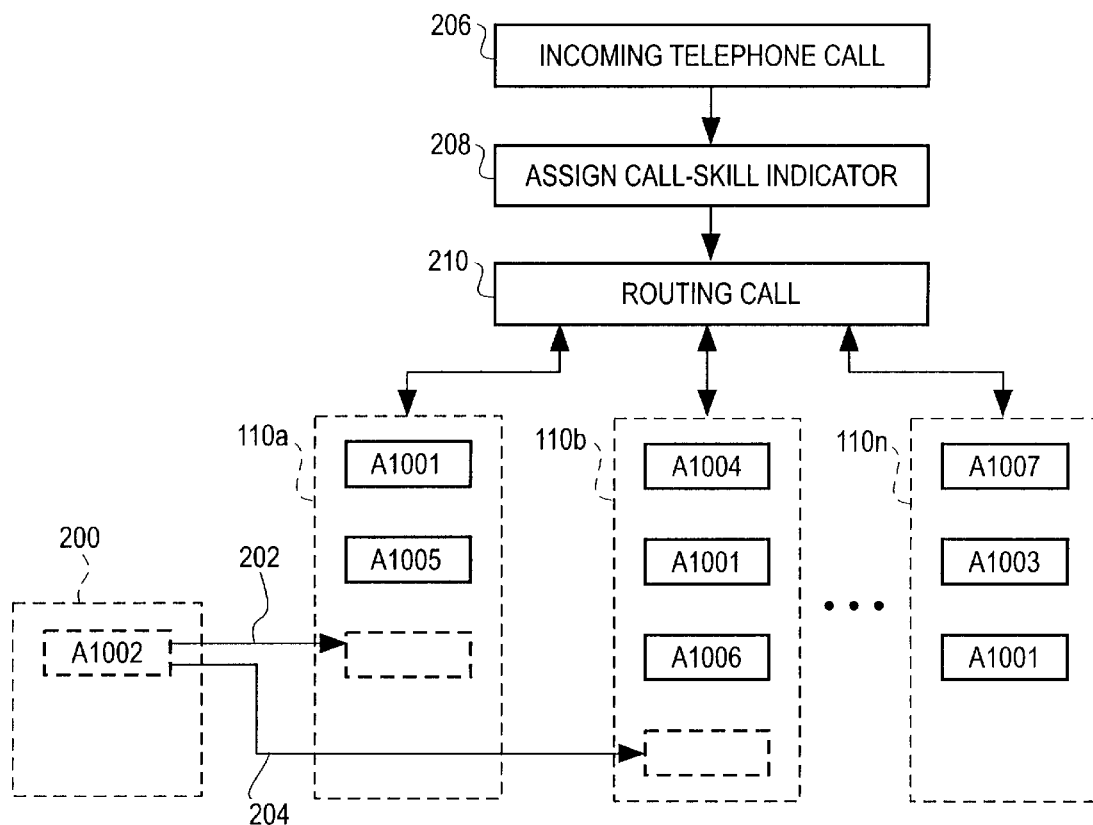
FIG. 2 is a flow chart showing routing of a telephone call and the grouping of agents in an ACD system in accordance of the present invention.

The operation of the ACD system 100, and more specifically the CPU 302, will now be discussed in detail with reference to FIG. 2. Initially, each agent is assigned one or more agent-skill indicators, such as agent-skill numbers, representative of one or more corresponding skills of the agent. The agent-skill indicators may, for example, be entered by a supervisor through the system control terminal 310. The agents are then grouped into skill groups 110a–110n based on their respective agent-skill indicators. In FIG. 2, the three skill groups 110a, 110b and 110n are shown comprised of currently available agents A1001, A1003, A1004, A1005, A1006 and A1007. Each skill group 110a, 110b and 110n is comprised of agents having a common agent-skill indicator. For example, each of the agents in the skill group 110a have an agent-skill indicator representing that they are fluent in Spanish. Similarly, the agents in the skill group 110b are fluent in English and the agents in the skill group 110n are fluent in French. As is apparent, an agent may have more than one agent-skill indicator and, therefore, be a member of more than one skill group.

Agents are arranged within each of the skill groups 110a, 110b and 110n by the amount of time they have been available to accept incoming telephone calls. The CPU 302 includes a timing means which detects the amount of time an agent has been available. The agent within the skill group having been available for the longest time is positioned to receive the next incoming telephone call routed to that skill group. Detecting the amount of time an agent has been available and arranging the agents within a skill group is readily accomplished by the CPU 302 using conventional programming techniques, or conventional electronic circuitry, and, consequently, will not be further discussed herein.

In FIG. 2, agent A1001 has been available for the longest time in the skill group 110a and will receive the next call routed thereto. Further, agent A1001, if available, will receive the second call routed to the skill group 110b or the third call routed to the skill group 110n. When an agent accepts a call or is otherwise unavailable, the agent is removed from all skill groups and is placed in an unavailable group 200. An unavailable agent being an agent who is presently unable to accept incoming telephone calls. Agent A1002 is shown residing in the unavailable group 200.

When agent A1002 becomes available, the CPU 302 is notified either through the system control terminal 310 or through the agent telephonic unit 308. The agent A1002 is then placed into the skill groups corresponding to the agent-skill indicators associated with the agent A1002. As shown by arrows 202 and 204, agent A1002 will be inserted into respective skill groups 110a and 110b when available. Of course, the agent A1002 will have been available for the shortest time in each skill group. Thus, each skill group continuously contains all of the available agents having the common agent-skill indicator in order of decreasing time of availability.

When an incoming call is received at 206, a call-skill indicator representative of a skill deemed useful in satisfying a need, or needs, of the external caller is identified at 208. As noted above, the call-skill indicator is based on DNIS information, ANI information or telephone trunk identification. The call-skill indicator is then matched with one of the common agent-skill indicators and its corresponding skill group.

The telephone call is then routed to the matched skill group and to the agent in the skill group who has been available for the longest time at 210. If no available agents are currently in the skill group, the call is placed in queue until an agent in the skill group becomes available. The call is thus connected to an agent having the desired skills without unnecessary, and time wasting, searching of unavailable agents or agents with undesired skills.

It is possible that two calls may be placed in queue waiting for an available agent in a skill group. Preferably, the call received first by the ACD system will receive the first available agent in the skill group. If two calls are in queues for two different skill groups and an available agent enters both skill groups, there are numerous ways to determine priority for the calls. For instance, the call first received by the ACD system may be connected to the agent or the skill groups may be prioritized and the call routed to the higher prioritized skill group is connected to the agent.

Having thus described the invention in detail by way of reference to preferred embodiments thereof, it will be apparent that other modifications and variations are possible without departing from the scope of the invention defined in the appended claims. For example, the ACD system may have hardware design configurations which depart from those described herein.

What is claimed is:

1. A method for routing an incoming telephone call from an external caller to one of a plurality of available agents in an automatic call distribution system, an available agent being an agent that is presently able to accept incoming telephone calls, the method comprising the steps of:

associating at least one agent-skill indicator with each of the agents, the agent-skill indicator being representative of at least one skill of each of the agents;

forming skill groups, each of the skill groups having a common agent-skill indicator associated therewith, inserting available agents into the skill groups by matching each of the at least one agent-skill indicators associated with each of the available agents and one of the common agent-skill indicators associated with the skill groups;

identifying a call-skill indicator deemed useful in satisfying a need of the external caller;

matching the call-skill indicator with one of the skill groups associated with a common agent-skill indicator which corresponds to the call-skill indicator; and connecting the external caller to one of the available agents in the matched skill group.

2. The method as recited in claim 1 wherein the step of identifying a call-skill indicator comprises the steps of:

detecting a telephone number called by the external caller; and selecting the call-skill indicator based on the telephone number.

3. The method as recited in claim 1 wherein the step of identifying a call-skill indicator comprises the steps of:

detecting a destination telephone number called by the external caller;

detecting an origin telephone number associated with a telephonic unit used by the external caller; and selecting the call-skill indicator based on the destination and origin telephone numbers.

4. The method as recited in claim 1 wherein the step of identifying a call-skill indicator comprises the steps of:

prompting the external caller to provide predetermined information; and using the information to select the call-skill indicator.

5. The method as recited in claim 1 wherein the step of associating at least one agent-skill indicator comprises the step of assigning at least one agent-skill number for each of the skills of each agent.

6. The method as recited in claim 1 comprising the step of removing each of the available agents from its corresponding skill groups as the agent becomes unavailable, an unavailable agent being an agent that is unable to accept incoming telephone calls.

7. The method as recited in claim 1 comprising the step of placing the external caller on hold when no available agents are contained in the matched skill group.

8. The method as recited in claim 1 wherein the step of forming skill groups of available agents comprises the steps of:

detecting a length of time during which each of the available agents are available; and wherein the step of connecting the external caller comprises the step of connecting the external caller to the agent who has been available for the longest length of time.

9. In an automatic call distribution system, a method for selecting agents to receive incoming telephone calls, the method comprising the steps of:

associating at least one agent-skill indicator with each of the agents, an agent-skill indicator being representative of a skill possessed by the agent associated therewith;

forming skill groups, each of the skill groups having a common agent-skill indicator associated therewith;

determining which of the agents are available, an available agent being an agent that is presently able to accept incoming telephone calls;

grouping the available agents in the skill groups by matching the agent-skill indicator associated with each agent and the common agent-skill indicator associated with each skill group;

receiving an incoming telephone call from a caller;

detecting a particular need of the caller;

matching the common agent-skill indicator associated with one of the skill groups and the need of the caller; and selecting one of the agents in the matched skill group to receive the incoming telephone call.

10. The method as recited in claim 9 comprising the steps of:

detecting when one of the available agents becomes unavailable, an unavailable agent being an agent that is presently unable to accept incoming telephone calls;

removing each of the unavailable agents from its corresponding skill groups;

detecting when each of the unavailable agents subsequently becomes available to accept incoming telephone calls; and inserting each of the detected available agents into its corresponding skill groups based on the at least one agent-skill indicator specified for the detected available agent.

11. The method as recited in claim 9 wherein the step of selecting one of the agents in the selected skill group comprises the step of selecting one of the agents in the selected skill group based on the length of time each of the agents in the selected skill group has been available.

12. The method as recited in claim 9 wherein the step of associating at least one agent-skill indicator comprises the step of assigning at least one agent-skill number to each of the agents.

13. An automatic call distribution system for matching skill requirements of an incoming telephone caller with skills of one of a plurality of agents, some of the agents being available to accept an incoming telephone call, the system comprising:

computer means for detecting the skill requirements of the caller, for specifying skills possessed by each of the plurality of agents, for creating a plurality of skill groups each of which has a common skill associated therewith and which contains available agents having the common skill, and for selecting one of the skill groups having the common skill associated therewith which matches the skill requirements of the caller; and connecting means for connecting the caller to one of the available agents within the selected skill group.

14. The automatic call distribution system as recited in claim 13 wherein the computer means comprises timing means for detecting a length of time during which each of the available agents has been available; and wherein the connecting means connects the caller to one of the available agents within the selected skill group based on the length of time each of the available agents has been available.

15. The automatic call distribution system as recited in claim 13 wherein the computer means detects when each of the available agents becomes unavailable; and a memory device for storing the detected unavailable agents until the unavailable agents become available, and wherein the computer means retrieves available agents from the memory device and inserts the available agents into appropriate ones of the skill groups.

16. The automatic call distribution system as recited in claim 13 wherein the computer means comprises:

called number means for detecting a destination telephone number called by the caller, and wherein the computer means determines the skill requirements of the caller based on the destination telephone number.

17. The automatic call distribution system as recited in claim 16 wherein the called number means identifies the destination telephone number called by the caller based on dialed number identification service information.

18. The automatic call distribution system as recited in claim 16 wherein the computer means comprises:

originating number means for detecting an origin telephone number indicative of telecommunications equipment used by the external caller to place the incoming telephone call; and wherein the computer means determines the skill requirement of the caller based on the destination and origin telephone numbers.

19. The automatic call distribution system as recited in claim 13 wherein the computer means comprises prompting means for prompting the caller to provide predetermined information; and wherein the computer means uses the information to detect the skill requirements of the caller.

\* \* \* \* \*